(12) United States Patent
Amrhein et al.

(10) Patent No.: US 7,464,981 B2
(45) Date of Patent: Dec. 16, 2008

(54) MOTOR VEHICLE AND SUBASSEMBLY OF A MOTOR VEHICLE

(75) Inventors: Frank Amrhein, Altdorf (DE);
Bernhard Schenk, Boeblingen (DE);
Carsten Unruh, Voehringen (DE)

(73) Assignee: Daimler AG, Stuttgart (DE)

( * ) Notice: Subject to any disclaimer, the term of this patent is extended or adjusted under 35 U.S.C. 154(b) by 91 days.

(21) Appl. No.: 11/373,650

(22) Filed: Mar. 9, 2006

(65) Prior Publication Data

US 2006/0273617 A1   Dec. 7, 2006

(30) Foreign Application Priority Data

Mar. 9, 2005   (DE) ........................ 10 2005 010 689

(51) Int. Cl.
*B60J 7/00*   (2006.01)
*B60R 21/13*  (2006.01)

(52) U.S. Cl. ................................. 296/107.16; 280/756

(58) Field of Classification Search . 296/107.01–107.2; 280/756
See application file for complete search history.

(56) References Cited

U.S. PATENT DOCUMENTS

| 5,066,040 | A | * | 11/1991 | Dangl et al. ................ 280/756 |
| 5,284,360 | A | * | 2/1994 | Busch et al. ................ 280/756 |
| 5,641,193 | A | * | 6/1997 | Zepnik et al. .......... 296/107.09 |
| 6,378,930 | B1 | | 4/2002 | Brettmann |
| 6,572,145 | B1 | * | 6/2003 | Guillez et al. ............... 280/756 |

FOREIGN PATENT DOCUMENTS

| DE | 43 24 461 | 1/1995 |
| DE | 295 14 732 | 1/1997 |
| DE | 199 05 578 | 8/2000 |
| DE | 199 59 317 | 1/2001 |
| DE | 100 50 284 | 4/2002 |
| DE | 101 52 332 | 5/2003 |

* cited by examiner

*Primary Examiner*—Dennis H Pedder
(74) *Attorney, Agent, or Firm*—Kenyon & Kenyon LLP

(57) ABSTRACT

In a motor vehicle and or a subassembly of a motor vehicle, e.g., a convertible or a roadster, with an opening roof, e.g., a soft top or a hardtop, which includes roof parts or roof elements which are mounted on a main bearing device so as to be able to pivot from a closed position into an open position, the main bearing device is fastened to a supporting structure of the motor vehicle, and with a roll bar which is fitted to the motor vehicle so as to be able to pivot from a storage position into a protective position. To reduce manufacturing costs, the main bearing device has an additional, secondary bearing device on which the roll bar is pivotally mounted.

14 Claims, 1 Drawing Sheet

MOTOR VEHICLE AND SUBASSEMBLY OF A MOTOR VEHICLE

CROSS-REFERENCE TO RELATED APPLICATIONS

The present application claims priority to Application No. 10 2005 010 689.7, filed in the Federal Republic of Germany on Mar. 9, 2005, which is expressly incorporated herein in its entirety by reference thereto.

FIELD OF THE INVENTION

The present invention relates to a motor vehicle and to a subassembly of a motor vehicle, e.g., a convertible or a roadster. The vehicle may include an opening roof, e.g., a soft top, a hardtop, etc., which may include roof parts or roof elements that are mounted on a main bearing device so as to be able to pivot from a closed position into an open position. The main bearing device may be fastened or fastenable to a supporting structure of the motor vehicle. A roll bar may be provided, which may be able to pivot from a storage position into a protective position and which may be fitted to or arranged on the motor vehicle substantially transversely to the direction of travel and has two longitudinal ends.

BACKGROUND INFORMATION

German Published Patent Application No. 43 24 461 describes a soft-top framework for a lowerable folding top with a main bearing which is screwed to the vehicle body.

German Published Patent Application No. 101 52 332 describes an opening vehicle roof with an adjustable roll bar which is pivotally mounted on a cover flap at each of its sides by a pivot bearing.

German Published Utility Model No. 295 14 732 describes a convertible with a roll bar which is articulated on the vehicle body.

German Published Patent Application No. 199 59 317 describes a convertible with a roof which can be stored in the rear region of the vehicle, this roof having roof parts which are capable of pivoting about rear bearing points.

SUMMARY

It is an aspect of example embodiments of the present invention to reduce costs associated with manufacturing a motor vehicle, e.g., a convertible or a roadster, with an opening roof, e.g., a soft top or a hardtop, which includes roof parts or roof elements which are mounted on a main bearing device so as to be able to pivot from a closed position into an open position, this main bearing device being fastened to a supporting structure of the motor vehicle, and with a roll bar which is fitted to the motor vehicle so as to be able to pivot from a storage position into a protective position.

In a motor vehicle, e.g., a convertible or a roadster, with an opening roof, e.g., a soft top or a hardtop, which includes roof parts or roof elements which are mounted on a main bearing device so as to be able to pivot from a closed position into an open position, the main bearing device being fastened to a supporting structure of the motor vehicle, and with a roll bar which is fitted to the motor vehicle so as to be able to pivot from a storage position into a protective position, the main bearing device may have an additional, secondary bearing device on which the roll bar is pivotally mounted. In conventional motor vehicles, the roll bar is fastened to the body shell independently of the main bearing device for the roof. As a result of the various reference locations on the vehicle, the tolerances thus may add up unfavorably, thereby entailing considerable adjustment work at the joints and transitions, for example, between the rear parcel shelf and the roll bar, using the fastening elements required for that purpose. Since the secondary bearing device for the roll bar is integrated according to example embodiments of the present invention into the main bearing device for the roof means that the assembly work may be significantly reduced.

In example embodiments of a motor vehicle, the main bearing device and the secondary bearing device may be connected to one another in one piece by a common supporting device. Accordingly, the position of the secondary bearing device with respect to the main bearing device is defined by the supporting device. This may make it possible to greatly reduce the adjustment work when assembling the roof and the roll bar.

In example embodiments of a motor vehicle, in which the roll bar is arranged substantially transversely to the direction of travel and has two longitudinal ends, the main bearing device may include two main bearings which each have an additional, secondary bearing on each of which a longitudinal end of the roll bar is pivotally mounted. The secondary bearing for the roll bar may be fitted on a conventional main bearing. The main bearing with the integrated secondary bearing is fastened to the body shell of the motor vehicle using screw connections, for example.

In example embodiments of a motor vehicle, one of the main bearings and one of the secondary bearings may in each case be connected to one another in one piece by a common supporting element. The common supporting element serves, inter alia, for fastening both the main bearing and the secondary bearing to the body shell of the motor vehicle. As in the case of conventional main bearings, the common supporting element may have further fastening arms fitted thereon, these being used to fasten further parts of the motor vehicle, such as the rear parcel shelf, for example.

In example embodiments of the motor vehicle, the two supporting elements may be connected to one another in one piece by a common crossmember. The common crossmember defines the position of the two supporting elements with respect to one another. This may considerably simplify the adjustment work during the assembly of the motor vehicle. However, it is also possible to determine the position of the supporting elements relative to one another during the assembly by a suitable assembly device.

In example embodiments of a motor vehicle, the additional, secondary bearing may have a bearing block which is connected in one piece to the associated main bearing. The bearing block may, for example, include two mutually parallel plates which are fastened to the supporting element and have a respective through hole for receiving a bearing pin.

In a subassembly of a motor vehicle, e.g., a convertible or a roadster, with an opening roof, e.g., a soft top or a hardtop, which includes roof parts or roof elements which are mounted on a main bearing device so as to be able to pivot from a closed position into an open position, and with a roll bar which is able to pivot from a storage position into a protective position and which is arranged substantially transversely to the direction of travel and has two longitudinal ends, the main bearing device may include two main bearings which each have an additional, secondary bearing on each of which a longitudinal end of the roll bar is pivotally mounted. The combination of the main bearing and secondary bearing may make it possible to completely preassemble the subassembly including the roof and the roll bar.

In example embodiments of the subassembly, one of the main bearings and one of the secondary bearings may in each case be connected to one another in one piece by a common supporting element. Thus, when assembling the subassembly, the common supporting elements is fastened to the body shell of the motor vehicle.

In example embodiments of the subassembly, the two supporting elements may be connected to one another in one piece by a common crossmember. The crossmember may allow the two supporting elements to be fixed relative to one another prior to assembly.

In example embodiments of the subassembly, the additional, secondary bearing may have a bearing block which is connected in one piece to the associated main bearing. The bearing block may be formed by two bearing plates which are fastened to the supporting element.

A main bearing for the roof and a secondary bearing for the roll bar may be combined in one component. The component may be a one-piece casting. However, the component may also be formed from a number of individual parts which are connected to one another in one piece, for example, by welding. The use of reinforced plastic materials is also possible.

According to an example embodiment of the present invention, a motor vehicle includes: a main bearing device fastened to a support structure of the motor vehicle; an openable roof including at least one of (a) roof parts and (b) roof elements mounted on the main bearing device to pivot between a closed position and an open position; and a roll bar fitted to the motor vehicle to pivot between a storage position and a protective position, the main bearing device including an additional, secondary bearing device, the roll bear pivotally mounted on the secondary bearing device.

The motor vehicle may be arranged as at least one of (a) a convertible and (b) a roadster.

The roof may be arranged as at least one of (a) a soft top and (b) a hard top.

The main bearing device and the secondary bearing device may be connected to one another in one piece by a common support device.

The roll bar may be arranged substantially transversely to a direction of travel of the motor vehicle and may include two longitudinal ends, and the main bearing device may include two main bearings. Each main bearing may include an additional, secondary bearing, and each longitudinal end of the roll bar may be pivotally mounted on a respective secondary bearing.

Each main bearing may be connected to a respective secondary bearing in one piece by a corresponding common support element.

The two support elements may be connected to each other in one piece by a common crossmember.

The additional, secondary bearing may include a bearing block connected in one piece to the respective main bearing.

According to an example embodiment of the present invention, a motor vehicle subassembly includes: a main bearing device; an openable roof including at least one of (a) roof parts and (b) roof elements mounted on the main bearing device to pivot between a closed position and an open position; and a roll bar pivotable between a storage position and a protective position and arrangeable substantially transversely to a direction of travel of the motor vehicle, the roll bar including two longitudinal ends, the main bearing device including two main bearings, each main bearing including an additional, secondary bearing, each longitudinal end of the roll bar pivotally mounted on a respective secondary bearing.

The motor vehicle may be arranged as at least one of (a) a convertible and (b) a roadster.

The roof may be arranged as at least one of (a) a soft top and (b) a hard top.

Each main bearing and respective secondary bearing may be connected to one another in one piece by a corresponding common support element.

The support elements may be connected to one another in one piece by a common crossmember each secondary bearing may include a bearing block connected in one piece to the respective main bearing.

Further aspects, features and details of example embodiments of the present invention are more fully described below with reference to the appended FIGURE.

BRIEF DESCRIPTION OF THE DRAWING

The FIGURE is a schematic perspective view of a component which, according to example embodiments of the present invention, include both a main bearing device for an opening vehicle roof and a secondary bearing device for a roll bar.

DETAILED DESCRIPTION

Figure 1:
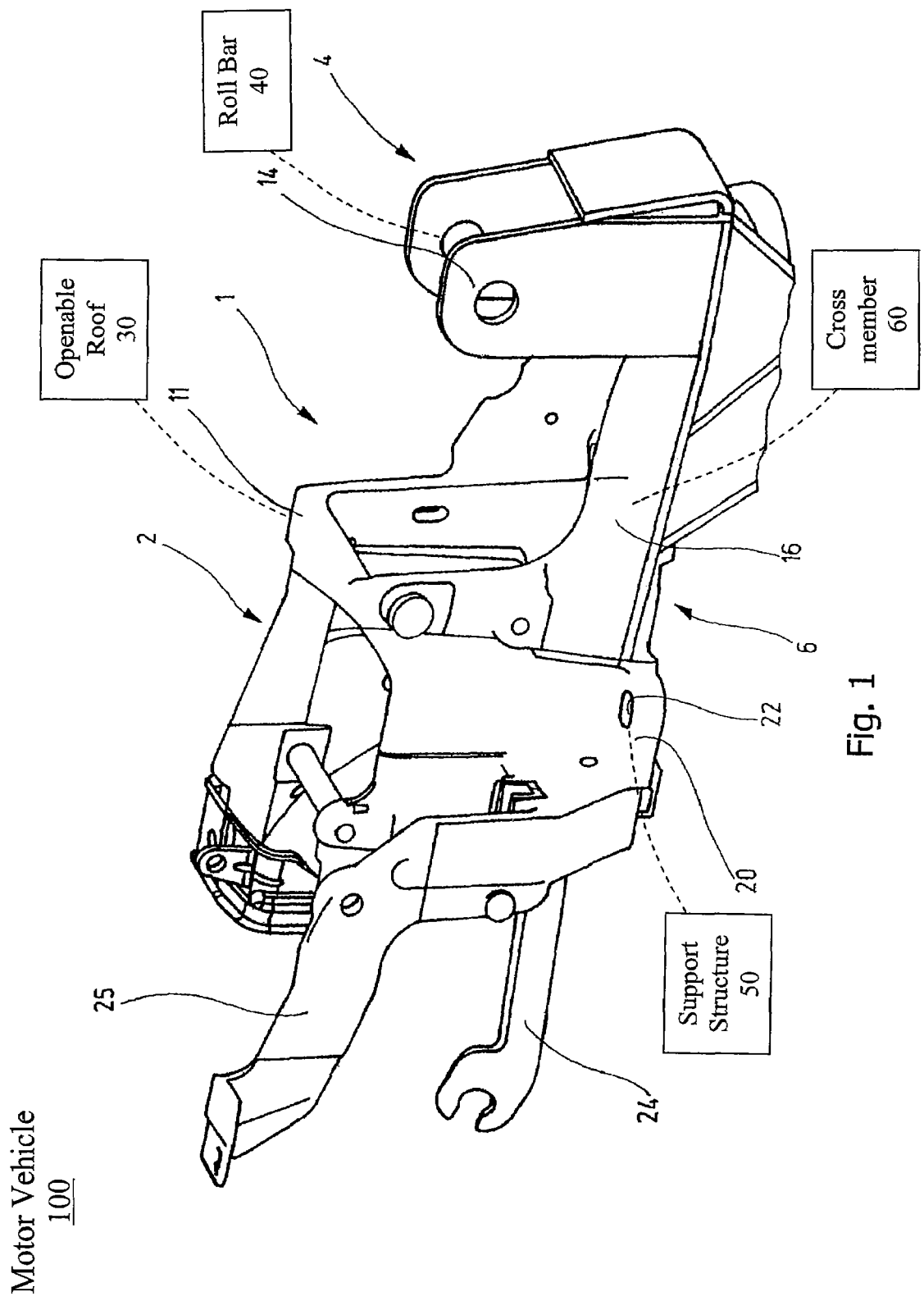

The FIGURE is a schematic perspective view of a component which, according to example embodiments of the present invention, include both a main bearing device for an opening vehicle roof and a secondary bearing device for a roll bar.

In order to enable occupants of a motor vehicle, e.g., a convertible or a roadster, to be effectively protected during an accident in which the vehicle turns over, modern convertibles or roadsters may have a roll bar which pops up during an accident and thereby produces a rolling contour which may prevent or at least reduce head injuries to the vehicle occupants as the vehicle turns over. During normal use of the vehicle, the roll bar is usually in a storage position in which it is stored behind the rear seats of the vehicle, for example. In a vehicle crash, e.g., when the vehicle turns over, the roll bar is transferred from this storage position into a protective position, in which it forms the aforementioned rolling contour. In the event of a crash, the swing-mounted roll bar is moved from the storage position into the protective position by a suitable drive device.

The FIGURE is a perspective view illustrating a component 1 into which a main bearing device 2 and a secondary bearing device 4 have been integrated. The main bearing device 2 includes a main bearing 11 which is used for fitting and mounting roof parts and/or roof elements of an opening roof 30.

The main bearing 11 is connected in one piece to a common supporting device 6 which includes a common supporting element 16. The secondary bearing device 4 includes a secondary bearing 14 which is connected in one piece to the common supporting device 6. The secondary bearing 14 is used for pivotally mounting one end of a roll bar 40. In addition to the secondary bearing 14, it is also possible for further parts, such as drive devices and/or locking devices, for example, to be fitted to the common supporting device 6 in the region of the secondary bearing 14. The common supporting elements 16 are connected to one another in one piece by a common crossmember 60.

The supporting element 16 has a fastening surface 20 which comes to bear, at least partially, on the support structure 50 of a motor vehicle 100 when the component 1 is in the assembled state. An oblong hole 22 is made in the fastening surface 20, this hole serving to receive a fastener, such as a screw, for example, by which the component 1 may be fastened, e.g., releasably, to the support structure 50. However, the component 1 may also be welded to the support structure 50 at the fastening surface 20.

Apart from the main bearing 11 and the secondary bearing 14, two fastening arms 24 and 25 are additionally fitted to the common supporting device 6 which includes the common supporting element 16. At their ends, the fastening arms 24 and 25 form support elements for further vehicle parts, such as a rear parcel shelf, for example. The component 1 may be a casting, or a welded part formed from a number of individual parts, etc.

What is claimed is:

1. A motor vehicle, comprising:
    a main bearing device fastened to a support structure of the motor vehicle;
    an openable roof including at least one of (a) roof parts and (b) roof elements mounted on the main bearing device to pivot between a closed position and an open position; and
    a roll bar fitted to the motor vehicle to pivot between a storage position and a protective position, the main bearing device including an additional, secondary bearing device, the roll bar pivotally mounted on the secondary bearing device.

2. The motor vehicle according to claim 1, wherein the motor vehicle is arranged as at least one of (a) a convertible and (b) a roadster.

3. The motor vehicle according to claim 1, wherein the roof is arranged as at least one of (a) a soft top and (b) a hard top.

4. The motor vehicle according to claim 1, wherein the main bearing device and the secondary bearing device are connected to one another in one piece by a common support device.

5. The motor vehicle according to claim 1, wherein the roll bar is arranged substantially transversely to a direction of travel of the motor vehicle and includes two longitudinal ends, the main bearing device including two main bearings, each main bearing including an additional, secondary bearing, each longitudinal end of the roll bar pivotally mounted on a respective secondary bearing.

6. The motor vehicle according to claim 5, wherein each main bearing is connected to a respective secondary bearing in one piece by a corresponding common support element.

7. The motor vehicle according to claim 6, wherein the two support elements are connected to each other in one piece by a common crossmember.

8. The motor vehicle according to claim 5, wherein the additional, secondary bearing includes a bearing block connected in one piece to the respective main bearing.

9. A motor vehicle subassembly, comprising:
    a main bearing device;
    an openable roof including at least one of (a) roof parts and (b) roof elements mounted on the main bearing device to pivot between a closed position and an open position; and
    a roll bar pivotable between a storage position and a protective position and arrangeable substantially transversely to a direction of travel of the motor vehicle, the roll bar including two longitudinal ends, the main bearing device including two main bearings, each main bearing including an additional, secondary bearing, each longitudinal end of the roll bar pivotally mounted on a respective secondary bearing.

10. The motor vehicle subassembly according to claim 9, wherein the motor vehicle is arranged as at least one of (a) a convertible and (b) a roadster.

11. The motor vehicle subassembly according to claim 9, wherein the roof is arranged as at least one of (a) a soft top and (b) a hard top.

12. The motor vehicle subassembly according to claim 9, wherein each main bearing and respective secondary bearing are connected to one another in one piece by a corresponding common support element.

13. The motor vehicle subassembly according to claim 12, wherein the support elements are connected to one another in one piece by a common crossmember.

14. The motor vehicle subassembly according to claim 9, wherein each secondary bearing includes a bearing block connected in one piece to the respective main bearing.

* * * * *